(12) United States Patent
Kharul et al.

(10) Patent No.: US 9,415,352 B2
(45) Date of Patent: Aug. 16, 2016

(54) POLYBENZIMIDAZOLE BASED MEMBRANE FOR DEACIDIFICATION

(75) Inventors: Ulhas Kanhaiyalal Kharul, Maharashtra (IN); Ramchandra Vitthal Gadre, Maharashtra (IN); Vithal Venkatrao Jogdand, Maharashtra (IN); Yogesh Jayasing Chendake, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 895 days.

(21) Appl. No.: 13/127,395

(22) PCT Filed: Feb. 24, 2010

(86) PCT No.: PCT/IB2010/000362
§ 371 (c)(1),
(2), (4) Date: Sep. 21, 2011

(87) PCT Pub. No.: WO2010/097681
PCT Pub. Date: Sep. 2, 2010

(65) Prior Publication Data
US 2012/0000852 A1    Jan. 5, 2012

(30) Foreign Application Priority Data

Feb. 25, 2009  (IN) .............................. 351/DEL/2009

(51) Int. Cl.
| B01D 71/62 | (2006.01) |
| B01D 71/48 | (2006.01) |
| B01D 61/00 | (2006.01) |
| B01D 67/00 | (2006.01) |

(52) U.S. Cl.
CPC ................ *B01D 71/62* (2013.01); *B01D 61/00* (2013.01); *B01D 67/003* (2013.01); *B01D 71/48* (2013.01); *B01D 2323/225* (2013.01); *B01D 2325/20* (2013.01); *Y02P 20/142* (2015.11)

(58) Field of Classification Search
None
See application file for complete search history.

(56) References Cited

U.S. PATENT DOCUMENTS

| 4,075,093 A | 2/1978 | Walch et al. |
| 4,828,699 A | 5/1989 | Soehngen |
| 4,842,740 A | 6/1989 | Chung et al. |
| 4,885,247 A | 12/1989 | Datta |
| 4,892,661 A | 1/1990 | Huang |
| 5,089,664 A | 2/1992 | Dalcanale et al. |
| 5,091,087 A | 2/1992 | Calundann et al. |
| 5,290,884 A | 3/1994 | Calundann et al. |
| 5,522,995 A | 6/1996 | Cockrem |
| 5,786,185 A | 7/1998 | Tsao et al. |
| 5,959,144 A | 9/1999 | Baniel |
| 5,968,362 A | 10/1999 | Russo, Jr. |
| 6,087,532 A | 7/2000 | Baniel et al. |
| 6,280,985 B1 | 8/2001 | Caboche et al. |
| 6,294,066 B1 | 9/2001 | Mani |
| 6,319,382 B1 | 11/2001 | Norddahl |
| 6,419,828 B1 | 7/2002 | Russo, Jr. |
| 6,489,508 B1 | 12/2002 | Van Gansbeghe et al. |
| 6,534,679 B2 | 3/2003 | Eyal et al. |
| 2005/0256296 A1* | 11/2005 | Kiefer et al. .................. 528/327 |

FOREIGN PATENT DOCUMENTS

WO    91/16123 A1    10/1991

* cited by examiner

*Primary Examiner* — Krishnan S Menon
(74) *Attorney, Agent, or Firm* — Jason D. Voight

(57) ABSTRACT

A membrane comprising polybenzimidazole and aromatic polyester wherein said aromatic polyester is removed is disclosed. The membrane is used for a process of deacidification.

16 Claims, 1 Drawing Sheet

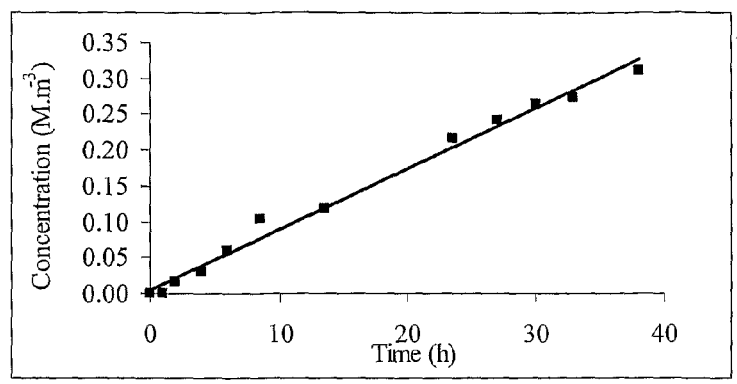

POLYBENZIMIDAZOLE BASED MEMBRANE FOR DEACIDIFICATION

TECHNICAL FIELD OF THE INVENTION

The present invention relates to a polybenzimidazole based membrane. The present invention also relates to process for preparation of said membrane and process for deacidification using the said membranes. More particularly this invention relates to the transport of acids through polymeric membranes based on polybenzimidazoles (PBI).

BACKGROUND AND PRIOR ART

A variety of methods like electrodialysis (ED), pervaporation (PV), solvent extraction (SE), esterification, vacuum distillation, etc. are reported for separation of acidic components from a solution in the literature.

U.S. Pat. Nos. 5,786,185; 5,968,362; 6,419,828; European patent EP0265409 disclose a method of recovery of acids using solid or liquid anion exchanger in presence of water or a suitable organic solvent in which the acid binds to the ion exchanger and is removed from solution containing other non-acidic component or impurities and the bound acid is eluted by a suitable solution or by a solvent.

Another method of purification of acids is by extraction with solvents that selectively or preferentially remove the acid and is disclosed in U.S. Pat. Nos. 5,089,664; 6,087,532 and 5,959,144.

U.S. Pat. No. 4,885,247 discloses electrodialysis method for removal of ionic compounds like salts of different acids using the cationic and anionic membranes with electrical charge. Bipolar electrodialysis method is also reported for the recovery of organic acids from their solutions (U.S. Pat. Nos. 6,280,985; 6,319,382 B1; 6,294,066).

U.S. Pat. No. 6,534,679 discloses a process for purification of organic acids by their esterification with suitable alcohol, distillation of the ester followed by hydrolysis of the ester to get pure acid.

Pervaporation using suitable membranes is also used for the removal or concentration of volatile organic and inorganic acids (Korean Patent KR 9511091B1; German Patent DE 4409906 C1; U.S. Pat. No. 4,892,661 A).

U.S. Pat. No. 6,489,508 B1 and Chinese patent 1335294 disclose a method of removal of organic compounds including acids, such as lactic acids by distillation using a high vacuum in a short path distillation mode.

Several chemical methods for removal of acids from complex mixtures by either extraction or ion exchange are being replaced by physical processes like membrane processes and distillation due to the increased environmental concerns.

The drawbacks of the existing processes for removal of organic acid from fermentation broth are given below:

The conventional processes for recovery of acid have several limitations such as need of multi-step process to recover acid, high energy requirement, generation of huge quantities of insoluble inorganic salts, process limitations (imposed by physical properties like boiling point, partition coefficient, etc), rate of separation and selectivity.

In the conventional process of recovery of lactic and citric acid from fermentation broth using calcium salt, the generation of huge quantities of insoluble calcium sulphate is a major problem.

In an ion exchange method using solid ion exchangers, there is a need for use of chemicals for regeneration of ion-exchange resins, giving rise to waste streams. It also causes undesirable dilution of the product stream. In addition, feed cannot be directly fed to the system and needs clarification and cleaning. In case of use of liquid amines like trioctyl amine as extracting agent, the regeneration of the extractant needs alkali or heat and can lead to loss of the amine. In addition, the un-recovered amines in the waste stream can be toxic and become environmental problem. The relatively high cost of such amines is also an obstacle in using them at industrial levels.

In case of deacidification or concentration of acids by electrodialysis, the feed needs to be treated prior to charging in electrodialysis cell. The capacity of electrodialysis cell also decreases due to deposition of $Ca^{++}$ or $Mg^{++}$ ions on the membrane. In some of the cases, particularly during fermentative production of organic acids, where bases are used for pH maintenance, the possibility of cell culture recirculation back to the fermentor reduces, as the death possibility increases. In many literature reports on electrodialysis, the transport of water, sugars and proteins from feed across the membrane are also well documented. Hence, the transported acid also contains some of the unwanted impurities. More importantly, the requirement of high amount of electrical power for electrodialysis-based separation is a major draw back of this process.

In case of conventional neutralization, salt formation could be disadvantageous, as it remains in the solution. Such salts might create purification and processing issues and can lead to the environmental pollution. Further, this method does not allow the reuse of acid.

In the process of distillation using short range and high vacuum, several unwanted volatile compounds get distilled and contribute to undesired impurities in the distillate that might subsequently become difficult to remove.

OBJECTIVE OF THE INVENTION

The objective of the invention is to provide a polybenzimidazole based membrane, wherein porosity creation is assisted by leaching out aromatic polyester component.

Another objective of the invention is to provide a polybenzimidazole membrane with aromatic polyester component, where the aromatic polyester component is removed before using the membrane.

Yet another objective of the invention is to provide a polybenzimidazole membrane with aromatic polyester component, where the aromatic polyester component is removed before using the membrane for deacidfication.

One more objective of the invention is to provide a single step process for deacidification using polybenzimidazole based membranes.

Another object of the invention is to provide a process for deacidification with high selectivity and separation of acid without formation of insoluble salts.

Yet another objective of the invention is to provide a membrane for deacidification that is stable under varying temperatures and acid concentrations.

SUMMARY OF THE INVENTION

A membrane prepared from polybenzimidazole and aromatic polyester is disclosed herein. The membrane of PBI and PAr is used for the process of deacidification, wherein the membrane is used after removing the PAr. Further, a PBI membrane for deacidification is also disclosed. The process of deacidification employs water as the preferred stripping agent Abbreviations:
PBI: Polybenzimidazole
PAr: Aromatic polyester
DNSA: 3,5-Dinitrosalicylic acid

BRIEF DESCRIPTION OF THE DRAWING

FIG. 1: Build up of NaOH concentration on stripping side by transport through membrane

DETAILED DESCRIPTION OF THE INVENTION

A synthetic membrane prepared from polybenzimidazole and aromatic polyester (PAr) is disclosed herein. A synthetic membrane prepared from polybenzimidazole and aromatic polyester (PAr), said PAr component subsequently removed before its use, is disclosed herein.

PBI based dense membrane, when used in deacidification, needs base as stripping agent for the transport of lactic acid to occur as exemplified in Examples No. 3 to 5. Since the process results in formation of salts, further processing steps are required to achieve deacidification. But when a membrane is prepared with PBI and PAr, wherein said PAr is removed, the resultant membrane has porosity. Further, for the membrane prepared with PBI and PAr, wherein said PAr is removed, the resultant membrane has porosity which is preferred for a process of deacidification. When the PBI membrane with PAr, wherein the PAr is removed is used for a process of deacidification, the process is achieved with water as stripping agent, thus achieving the various objectives of the invention including but not limited to providing a process for deacidification with high selectivity and transport rate of acid without formation of insoluble salts.

PBI and PAr are dissolved in a solvent, preferably N,N-dimethylacetamide in varying proportion. The membrane is prepared by solution casting method at 80° C. At this temperature, solvent is evaporated, leaving behind the dense film (pre-membrane). The pre-membrane is dipped in base solution. The PAr is prone to hydrolysis in presence of base. The PAr on the premembrane surface initially gets hydrolyzed in presence of base and the product of hydrolysis (i.e. the monomers used for PAr formation) are converted to Na-salt form in presence of excess of NaOH. These Na-salts dissolve in base solution and thus are leached out. This creates molecular size porosity and provides room for $OH^-$ to attack inside the bulk of premembrane. This way, the degradation caused by $OH^-$ species creates molecular level porosity throughout the bulk of the membrane matrix.

The disclosed membrane is used in the process of deacidification, said process comprising contacting of feed solution containing acid or a mixture of acids in continuous, semicontinuous or batchwise mode, on one side of the polybenzimidazole based membrane; removing the transported acid from the permeate side of the membrane by a liquid or an extractant solution.

The polybenzimidazoles of the membrane of the invention is of formula I or II

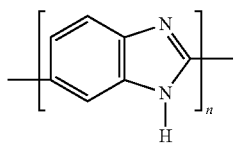

I

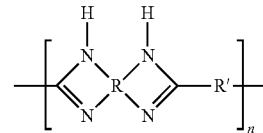

II wherein, R belongs to the tetraamine monomer having structure III(a)-III(f) and R' is from dicarboxylic acid as shown in structure IV:

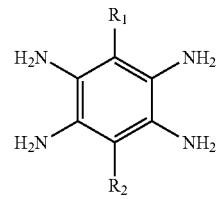

III(a)

wherein, $R_1$, $R_2$=H, $CH_3$, $CF_3$, F, Cl, Br, I, $NO_2$ or $C_{1-24}$ containing alkyl or aryl groups.

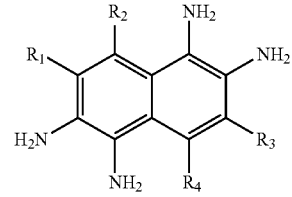

III(b)

wherein, $R_1$, $R_2$, $R_3$, $R_4$=H, $CH_3$, $CF_3$, F, Cl, Br, I, $NO_2$ or $C_{1-24}$ alkyl or aryl groups.

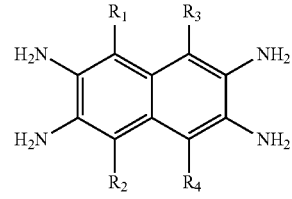

III(c)

wherein, $R_1$, $R_2$, $R_3$, $R_4$=H, $CH_3$, $CF_3$, F, Cl, Br, I, $NO_2$ or $C_{1-24}$ alkyl or aryl groups.

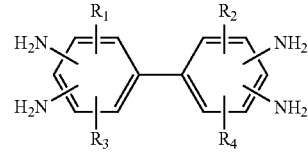

III(d)

wherein, $R_1$, $R_2$, $R_3$, $R_4$=H, $CH_3$, $CF_3$, F, Cl, Br, I, $NO_2$ or, $C_{1-24}$ alkyl or aryl groups.

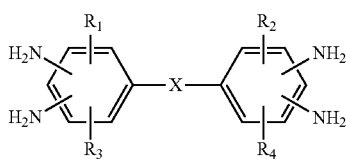
III(e)

wherein, $R_1$, $R_2$, $R_3$, $R_4$=H, $CH_3$, $CF_3$, F, Cl, Br, I, $NO_2$ or $C_{1-24}$ alkyl or aryl groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C(isopropyl)$-, —$CH_3C(t$-butyl)-, —$CH_3C(n$-propyl)-, —$CH_3C(ethyl)$- or any other $C_{1-24}$ containing alkyl or aryl groups.

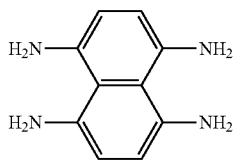
III(f)

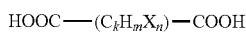
IV where k=1-30 containing alkyl, aryl, aromatic ring, arylene, alkylene, arylene-ether or heterocyclic ring such as pyridine, pyrazine, furan, quinoline or thiophene groups as straight chain, branched, cyclic, aromatic or combination of these; X=O, N, S, halogen or combination thereof, n=0-10 and m=appropriate numbers of hydrogen.

The aromatic polyester (PAr) has structural formula V

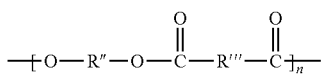
V wherein, R" is derived from phenolphthalein or its derivatives as shown in formula VI and R'" is from dicarboxylic acid as shown in IV:

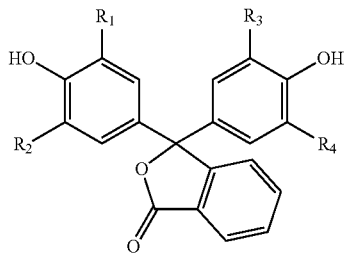
VI wherein, $R_1$, $R_2$, $R_3$, $R_4$=H, $CH_3$, $CF_3$, F, Cl, Br, I, $NO_2$ or $C_{1-24}$ alkyl or aryl groups.

The composition of PBI:PAr in blend varies in the range of 0.99:0.01 to 0.01:0.99.

The polybenzimidazole is basic in nature and hence, is selective only for acids. Other impurities/solutes in the mixture like organic compounds (such as glucose) or salts do not get sorbed into the membrane material and are not permeated to the other side of the membrane as exemplified herein. Also, PBI exhibits high water sorption capacity (7-21 wt % for different PBIs) thereby, facilitates transport of acid, while other solutes like small organic molecules do not permeate through the membrane. PBI is known to be thermally and chemically stable.

The membrane of the invention thus acts as an interphase, allowing only acids to be permeated based on concentration gradient as the driving force. The transported acid is removed from other side of the membrane surface by suitable extractant solvent or solution (stripping agent). The stripping agent is selected from solutions of bases, water and organic solvents, preferably water as exemplified in examples 8 to 16.

The said base solutions are selected from aqueous or alcoholic NaOH, KOH, $Na_2CO_3$, $NaHCO_3$ and such like. Dense membrane of PBI (films casted from suitable solvent) show significant acid transport when the stripping agent is base solution. The transport is nil or very low when water is used as the stripping agent.

To facilitate/enhance transport with water as stripping agent, the said chemically active poly(benzimidazoles) (PBI) membrane is prepared with precise control on porosity. The porosity of molecular size of said chemically active membranes is achieved by a process comprising of:
a) Preparing a blend membrane, which comprises polybenzimidazoles (PBI) and aromatic polyester (PAr) in appropriate proportion;
b) Leaching out the polyester using base solution and
c) Washing.

The base for leaching the blend membrane is selected from an aqueous or alcoholic solution of organic or inorganic base such as KOH, NaOH, ammonia, triethyl amine, trimethyl amine, dimethyl formamide, dimethyl acetamide, aniline, alone or in combinations thereof, solvents selected from dioxane, tetrahydrofuran, acetone and methyl ethyl ketone, alone or in combinations thereof.

The membrane is washed with suitable solvent such as acetone, methanol, ethanol, isopropanol, hexane, petroleum ether, water, propanol, butanol, hexanol, cyclohexanol, octanol, pentanol, isobutanol, chloroform, toluene, cyclohexane, tetrachloroethane, tetrachloromethane, dichloromethane, aniline or derivatives of aniline, ionic liquids, supercritical carbon dioxide and such like, alone or in combinations thereof.

The membrane is prepared in flat sheet, hollow fiber, tubular form, thin film composite, asymmetric membrane or any other adaptable form.

The process of deacidification of the invention comprises:
a) Optional pre-treatment of membrane with the solution of acid intended to be separated;
b) Circulating the feed solution containing the acid that is intended to be separated on the feed side of the membrane and
c) Circulating the stripping agent on the permeate side of the membrane.

In one aspect of the invention, the process of deacidification uses membrane comprising polybenzimidazoles having chemical structure as shown in formula VII or VIII:

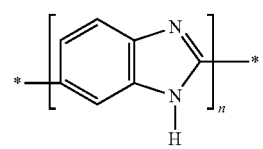
Formula VII

Formula VIII

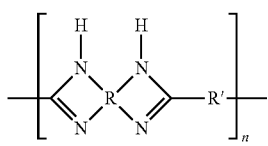

wherein; R is derived from tetramine as shown in Figure VII(a)-VII(e) and R' is from dicarboxylic acid as shown in Figure VIII (a)-VIII (k).

FIG. VII (a)

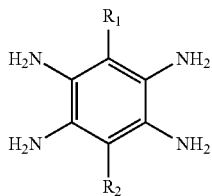

where; $R_1$, $R_2$=H, $CH_3$, $CF_3$, F, Cl, Br, I, $NO_2$ or $C_{1-24}$ containing alkyl or aryl groups.

FIG. VII (b)

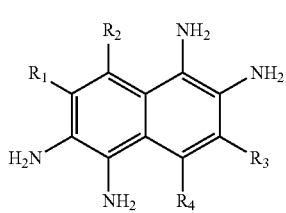

where; $R_1$, $R_2$, $R_3$, $R_4$=H, $CH_3$, $CF_3$, F, Cl, Br, I, $NO_2$ or $C_{1-24}$ containing alkyl or aryl groups.

FIG. VII (c)

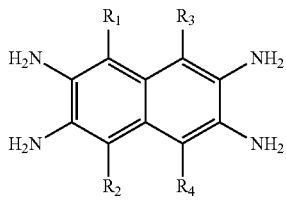

where; $R_1$, $R_2$, $R_3$, $R_4$=H, $CH_3$, $CF_3$, F, Cl, Br, I, $NO_2$ or $C_{1-24}$ containing alkyl or aryl groups.

FIG. VII (d)

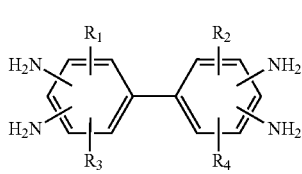

where; $R_1$, $R_2$, $R_3$, $R_4$=H, $CH_3$, $CF_3$, F, Cl, Br, I, $NO_2$ or $C_{1-18}$ containing alkyl or aryl groups.

FIG. VII (e)

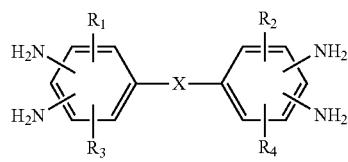

where; $R_1$, $R_2$, $R_3$, $R_4$=H, $CH_3$, $CF_3$, F, Cl, Br, I, $NO_2$ or $C_{1-15}$ containing alkyl or aryl groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or any other $C_{1-15}$ containing alkyl or aryl groups.

$$HOOC—(C_kH_mX_n)—COOH$$  Figure VIII (a)

where; k=1-30 containing alkyl, aryl, aromatic ring, arylene, alkylene, arylene-ether or heterocyclic ring such as pyridine, pyrazine, furan, quinoline, thiopene groups as straight chain, branched, cyclic, aromatic or combination of these; m=appropriate number of hydrogen; X=O, N, S, halogen or combination of these and n=0-10.

FIG. VIII (b)

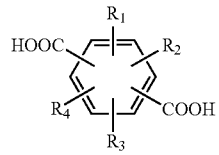

where; $R_1$, $R_2$, $R_3$, $R_4$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

FIG. VIII (c)

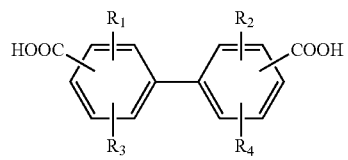

where; $R_1$, $R_2$, $R_3$, $R_4$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

FIG. VIII (d)

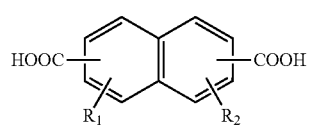

where; $R_1$, $R_2$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

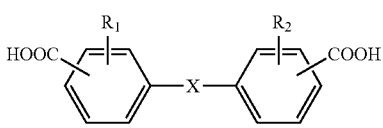

FIG. VIII (e)

where; $R_1$, $R_2$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or $C_{1-15}$ containing alkyl or aryl groups.

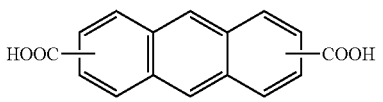

FIG. VIII (f)

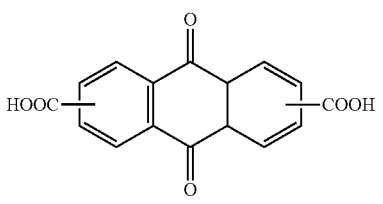

FIG. VIII (g)

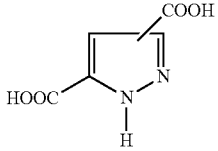

FIG. VIII (h)

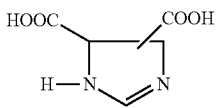

FIG. VIII (i)

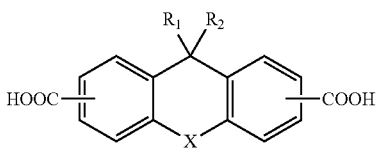

FIG. VIII (j)

where; $R_1$, $R_2$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups and X can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or $C_{1-15}$ containing alkyl or aryl groups.

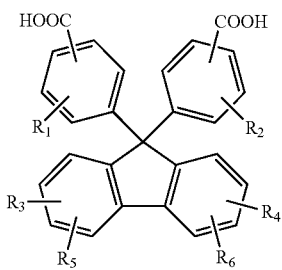

FIG. VIII (k)

where; $R_1$, $R_2$, $R_3$, $R_4$, $R_5$, $R_6$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

The feed solution comprises at least one acid in concentration greater than 0.001%.

In one embodiment, the feed solution comprises organic acid, inorganic acid, organic salt, inorganic salt, sugar, polymer, oligomer, protein, living or dead cell, pigment and such like, alone or in combinations thereof.

The polybenzimidazole membrane of the invention is optionally treated before use with organic solvents selected from acetone, water, methanol, ethanol, isopropanol, hexane, petroleum ether, propanol, butanol, hexanol, cyclohexanol, octanol, pentanol, isobutanol, dimethyl formamide, dimethyl acetamide, N-methyl 2-pyrrolidone, chloroform, toluene, cyclohexane, tetrachloroethane, tetrachloromethane, dichloromethane, aniline, derivatives of aniline, ionic liquids, supercritical carbon dioxide, feed solution and such like alone or in combinations thereof.

The stripping agent on the permeate side of the membrane is water, ammonia, organic solvents, organic bases, inorganic bases, ionic liquid, supercritical carbon dioxide and such like. The organic solvents are selected from acetone, alcohols, ethyl acetate, diethyl ether, hexane, toluene, methyl ethyl ketone, tetrahydrofuran, dioxane, dimethyl formamide, dimethyl acetamide and such like, alone or in combinations thereof. Inorganic bases are selected from NaOH, KOH, $Na_2CO_3$, $NaHCO_3$ and such like, alone or combinations thereof, Organic bases are triethyl amine, dimethyl amine, trioctyl amine, ethyl amine, diethyl amine, ethanolamine, diethanolamine, butyl amine, tributyl amine, aniline or derivatives of aniline and such like, alone or in combinations thereof.

The process is optionally operated in the temperature range from −70° C. to 200° C.

The several advantages of the invention and its industrial applications are listed herein:
 The selectivity of the membranes for acid over small organics or salt is practically infinity, as the transport for glucose and inorganic salt is practically non-existent.
 Acid separation is a single step process overcoming the multi-step lactic acid separation from fermentation broth by, conventional processes. (viz. addition of carbonate salts, precipitation, filtration, acidification and separation of salts in case of neutralization).
 With water as the stripping agent, recovery of product from the permeated stream is easier; avoiding contamination with other chemicals and acid is obtained in pure form.
 The process does not involve generation of impurities or waste stream or sludge and thus is environmentally benign.
 Downstream processing of the product does not lead to hazardous waste stream generation and in many cases, is reusable.
 This process allows the fermentative process of acid production to be used in continuous mode.
 The process can be used for continuous recovery of the acid from various process streams leading to higher yields.
 Conventional advantages of membrane based separation processes viz. modular nature, operational simplicity, ease of scale up and environment friendliness are applicable for current process also.
 The process needs energy for circulation only, that is for passing the liquid containing acid over the membrane surface and thus, is highly energy efficient. This can be an advantage contributing largely to the economical feasibility.

The membrane material is highly stable over a wide range of temperature and to common chemicals like acids, bases and most of the common solvents. Thus, they can be used for wide range of applications involving stringent conditions and are expected to have longer life.

The process can be used for concentrating organic as well as inorganic acids, removal of acids from given mixtures, recovery of valuable acids from various process streams, deacidification of fruit juices, deacidification of various industrial process streams, effluent treatment and recovery of acids from fermentation broth. Removal of acids from solution is also required in industries related to food processing, synthetic chemistry, natural products, inorganic chemicals and others.

The following examples are given by way of illustration and therefore should not be construed to limit the scope of the present invention.

EXAMPLES

Example 1

Synthesis of poly(benzimidazole) (PBI)

A three-neck round bottom flask equipped with a mechanical stirrer, nitrogen inlet and an outlet was charged with 450 g of polyphosphoric acid and heated with stirring above 100° C. under constant flow of nitrogen. 15 g (0.07 mol) of 3,3'-diaminobenzidine and 11.63 g (0.07 mol) of isophthalic acid or 11.63 g (0.07 mol) of terephthalic acid or 15.56 g (0.07 mol) of 5-tert-butylisophthalic acid or 11.78 g (0.07 mol) of 2,6-pyridine dicarboxylic acid was added to the reaction mixture. The temperature was slowly raised to 200° C. and maintained for specified time as given in Table 1 for individual case. The polymer was obtained by precipitating the formed solution into water. The precipitated polymer was washed with water, followed by aqueous sodium bicarbonate and water. The obtained polymer was dried at 80° C. under vacuum.

TABLE 1

| Diacid used | Duration of Reaction (h) | Polymer abbreviation |
| --- | --- | --- |
| Isophthalic acid | 22 | PBI-I |
| Terephthalic acid | 10 | PBI-T |
| 5-tert-butylisophthalic acid | 20 | PBI-BuI |
| 2,6-pyridine dicarboxylic acid | 25 | PBI-2,6-Py |

Example 2

A 3.2 g of dry PBI polymer, as prepared in Example 1 was dissolved in 200 ml of N,N-dimethyl acetamide while heating at 80° C. for 8 hours. The solution was filtered and poured onto a flat inert surface. The solvent was evaporated at 80° C. under dry inert atmosphere. The formed film was peeled off, washed with water and dried in vacuum oven at 100° C. The thickness of the film was 35±5 μ.

Example 3

The membranes of PBI-I or PBI-T, as prepared in Example 2 was treated with 10% aqueous lactic acid (w/v) solution for 1 day and mounted in a plate and frame (PF) module. On feed side an aqueous solution containing 10% lactic acid (w/v) and 10% glucose (w/v) was circulated. A stripping agent (as given in Table 2) was circulated on the permeate side of the membrane. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 2 below.

TABLE 2

| Membrane used | Stripping Agent | Flux of Lactic acid $(g \cdot m^{-2} \cdot hr^{-1})$ | Flux of Glucose $(g \cdot m^{-2} \cdot hr^{-1})$ | Permeability of lactic acid $(m \cdot sec^{-1})$ |
| --- | --- | --- | --- | --- |
| PBI-I | 5.9% (w/v) aq. $Na_2CO_3$ | 4.4 (±1) | 0 | 7 (±6) × $10^{-13}$ |
| PBI-I | 0.9% (w/v) aq. NaOH | 11.9 (±2) | 0 | 16.1 (±4) × $10^{-13}$ |
| PBI-I | 5.5% aq. triethylamine | 7 (±1) | 0 | 9 (±1) × $10^{-13}$ |
| PBI-I | 13.7% triethylamine in hexane | 0 | 0 | 0 |
| PBI-I | Water | 0 | 0 | 0 |
| PBI-T | 10.4% aq. $NaHCO_3$ | 9.92 (±0.5) | 0 | 13.8 (±1.7) × $10^{-13}$ |
| PBI-T | 0.9% (w/v) aq. NaOH | 24.7 (±3) | 0 | 62 (±20) × $10^{-13}$ |
| PBI-T | 5.5% aq. triethylamine | 27.22 | 0 | 39.6 × $10^{-13}$ |
| PBI-T | 10% (w/v) triethylamine in hexane | 0.66 | 0 | 0.72 × $10^{-13}$ |

Example 4

The membranes of PBI-I or PBI-2,6-Py, as prepared in Example 2 was treated with 10% aqueous acetic acid (w/v) solution for 1 day and mounted in a plate and frame (PF) module. On feed side an aqueous solution containing 10% acetic acid (w/v) and 10% glucose (w/v) was circulated. A 1.6 N aq. NaOH was circulated on the permeate side of the membrane, as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 3 below.

TABLE 3

| Membrane used | Stripping agent | Flux of acetic acid (g·m$^{-2}$·h$^{-1}$) | Flux of glucose (g·m$^{-2}$·h$^{-1}$) | Permeability of acetic acid (m·sec$^{-1}$) |
|---|---|---|---|---|
| PBI-2,6-Py | 1.6N Aq. NaOH | 26.6 | 0 | 70 × 10$^{-13}$ |
| PBI-2,6-Py | Water | 11.9 | 0 | 64.2 (±1) × 10$^{-13}$ |
| PBI-I | 1.6N aq. NaOH | 38 (±5) | 0 | 74.6 (±2) × 10$^{-13}$ |
| PBI-I | Water | 2.05 | 0 | 2.82 × 10$^{-13}$ |

Example 5

The membranes of PBI-I, PBI-T or PBI-2,6-Py, as prepared in Example 2 was treated with acid (as given in Table 4) for 1 day and mounted in a plate and frame (PF) module. On feed side, an aqueous solution containing acid (as given in Table 4) was circulated. 1 N NaOH was circulated on the permeate side of the membrane, as a stripping agent. The transport of acid through the membrane was studied at 40° C. The samples at various time intervals were analyzed by titration to determine the acid transport. The results are summarized in Table 4 below.

TABLE 4

| Membrane used | Acid in feed solution | Stripping solution used | Flux of acid (g·m$^{-2}$·hr$^{-1}$) |
|---|---|---|---|
| PBI-I | 1N aq. HCl | 1N aq. NaOH | 7.2 |
| PBI-I | 0.5N aq. H$_2$SO$_4$ | Water | 16.1 |
| PBI-I | 0.5N aq. H$_3$PO$_4$ | 1N aq. NaOH | 6.0 |
| PBI-T | 0.5N aq. HCl | Water | 2.7 |
| PBI-T | 0.5N aq. HNO$_3$ | 0.5N aq. NaOH | 13.4 |
| PBI-2,6-Py | 0.5N aq. H$_2$SO$_4$ | 1N aq. NaOH | 24.9 |

Example 6

The membrane of PBI-I, as prepared in Example 2 was mounted in a plate and frame (PF) module. On feed side of the PF module, acidified lactic acid fermentation broth containing 9.8% lactic acid, 0.7% malic acid, 0.6% succinic acid, 0.3% acetic acid and 3.2×10$^{-3}$% fumaric acid was circulated. A stripping solution containing 0.9 N NaOH was circulated on the permeate side of the membrane. The transport of acid through the membrane was studied at 40° C. The samples at various time intervals were analyzed by high performance liquid chromatography (HPLC) to determine the acid transport. The results are summarized in Table 5 below.

TABLE 5

| Acid | Flux of acid (g·m$^{-2}$·hr$^{-1}$) |
|---|---|
| Lactic acid | 12.5 |
| Malic acid | 0.2 |
| Succinic acid | 0 |
| Acetic acid | 0.4 |
| Fumaric acid | 4.5 × 10$^{-3}$ |

Example 7

The membrane of PBI-I, as prepared in Example 2 was mounted in a plate and frame (PF) module. On feed side of the PF module, an acid solution containing 10% lactic acid, 0.2% malic acid, 0.2% succinic acid, 0.2% acetic acid and 0.2% fumaric acid was circulated. A stripping solution containing 0.24 N NaOH was circulated on the permeate side of the membrane. The transport of acid through the membrane was studied at 40° C. The samples at various time intervals were analyzed by high performance liquid chromatography (HPLC) to determine the acid transport. The results are summarized in Table 6 below.

TABLE 6

| Acid | Flux of acid (g·m$^{-2}$·hr$^{-1}$) |
|---|---|
| Lactic acid | 3.8 |
| Malic acid | 0.0 |
| Succinic acid | 0.0 |
| Acetic acid | 0.0 |
| Fumaric acid | 0.7 |

Example 8

Synthesis of phenolphthalein based polyester (Ppha-IT)

A three-neck round bottom flask equipped with a mechanical stirrer and rubber septum charged with 40 g (0.1257 mol) of phenolphthalein was dissolved in aqueous solution containing 10.30 g (0.2572 mol) of NaOH in 110 ml of water. To this, 0.716 g (0.003 mol) of benzyltriethylammoniumchloride and 177 ml dichloromethane was added and stirred vigorously. A solution containing 13.01 g (0.0641 mol) each of isophthaloyl chloride and terephthaloyl chloride dissolved in 200 ml of dichloromethane was added, with vigorous stirring. The solution was further stirred for an hour. The polymer was obtained by precipitating organic phase in acetone and drying in an oven at 60° C. for 1 day. The polymer was purified by dissolving in chloroform and precipitating in stirred acetone, followed by drying in an oven at 60° C. for 2 days.

Example 9

Preparation of Membrane

Dry PBI and poly(phenylene iso-terephthalate) (Ppha-IT) were dissolved in N,N-dimethyl acetamide (DMAc) in different proportions as (i) Ppha-IT:PBI-I=1:1, (ii) Ppha-IT:PBI-I=1:3, (iii) Ppha-IT:PBI-BuI=3:1, (iv) Ppha-IT:PBI-BuI=1:1, (v) Ppha-IT:PBI-BuI=1:3; while heating at 80° C. for 8 hour. The solution was filtered and poured onto a flat glass surface. The solvent was evaporated at 80° C. under dry and inert atmosphere. The formed film was peeled off, washed with water and dried in vacuum oven at 100° C. The thickness of the film was 20±5μ. These membranes were treated with 5% aqueous NaOH (w/v) solution for 20 days at 60° C. The treated membrane was then washed with water for 4 days at 60° C.

Example 10

The membranes prepared as given in Example 9 were treated with 10% aqueous lactic acid (w/v) solution for 1 day and mounted in a plate and frame (PF) module. On the feed side, an aqueous solution containing 10% lactic acid (w/v) and 10% glucose (w/v) was circulated. Water was circulated on the permeate side of the membrane as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 7 below.

TABLE 7

| Membrane used | Flux of lactic acid $(g \cdot m^{-2} \cdot h^{-1})$ | Flux of glucose $(g \cdot m^{-2} \cdot h^{-1})$ | Permeability of lactic acid $(m \cdot sec^{-1})$ |
|---|---|---|---|
| Membrane (i) | 7.3 (±1) | 0 | $1.09 \times 10^{-12}$ |
| Membrane (ii) | 2.7 (±0.5) | 0 | $0.41 \times 10^{-12}$ |
| Membrane (iii) | 11.8 (±0.9) | 0 | $1.6 \times 10^{-12}$ |
| Membrane (iv) | 30 | 0 | $4.6 \times 10^{-12}$ |
| Membrane (v) | 7.5 (± 0.7) | 0 | $0.7 \times 10^{-12}$ |

Example 11

The membrane (i) prepared as given in Example 9 was treated with 10% aqueous lactic acid (w/v) solution for 1 day and mounted in a plate and frame (PF) module. On the feed side, an aqueous solution containing 10% lactic acid (w/v) and 10% glucose (w/v) was circulated. Water was circulated on the permeate side of the membrane as a stripping agent. The transport of acid through the membrane was studied at different temperatures ranging from 30° C. to 70° C. The samples at various time intervals were analyzed by titration to determine the acid transport. At the end of the experiment, stripping solution was analyzed by DNSA for occurrence of glucose. The results are summarized in Table 8 below.

TABLE 8

| Temperature ° C. | Flux of lactic acid $(g \cdot m^{-2} \cdot h^{-1})$ | Flux of glucose $(g \cdot m^{-2} \cdot h^{-1})$ | Permeability of lactic acid $(m \cdot sec^{-1})$ |
|---|---|---|---|
| 30 | 1.3 | 0 | $0.25 \times 10^{-12}$ |
| 40 | 6.4 | 0 | $1.16 \times 10^{-12}$ |
| 50 | 6.7 | 0 | $1.38 \times 10^{-12}$ |
| 60 | 9.4 | 0 | $1.91 \times 10^{-12}$ |
| 70 | 14.7 | 0 | $2.68 \times 10^{-12}$ |

Example 12

The membrane (i) prepared as given in Example 9 was treated with 10% aqueous lactic acid (w/v) solution for 1 day and mounted in a plate and frame (PF) module. On the feed side, an aqueous solution containing equal quantities of acid (w/v) and glucose (w/v) was circulated, at various concentrations. Water was circulated on the permeate side of the membrane as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 9 below.

TABLE 9

| Concentration of lactic acid (w/v) (%) | Flux of lactic acid $(g \cdot m^{-2} \cdot h^{-1})$ | Flux of glucose $(g \cdot m^{-2} \cdot h^{-1})$ | Permeability of lactic acid $(m \cdot sec^{-1})$ |
|---|---|---|---|
| 10 | 6.4 | 0 | $1.16 \times 10^{-12}$ |
| 7 | 4.8 | 0 | $1.31 \times 10^{-12}$ |
| 4 | 2.85 | 0 | $0.85 \times 10^{-12}$ |
| 3 | 2.1 | 0 | $1.45 \times 10^{-12}$ |
| 1 | 1.0 | 0 | $1.91 \times 10^{-12}$ |

Example 13

The membrane (i) prepared as given in Example 9 was treated with 10% aqueous citric acid (w/v) solution for 1 day and mounted in a plate and frame (PF) module. On the feed side, an aqueous solution containing 10% citric acid (w/v) and 10% glucose (w/v) was circulated. Water was circulated on the permeate side of the membrane as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 10 below.

TABLE 10

| Stripping agent | Flux of citric acid $(g \cdot m^{-2} \cdot h^{-1})$ | Flux of glucose $(g \cdot m^{-2} \cdot h^{-1})$ | Permeability of citric acid $(m \cdot sec^{-1})$ |
|---|---|---|---|
| Water | 0.28 (±0.09) | 0 | $0.132 \times 10^{-12}$ |

Example 14

The membrane (i) prepared as given in Example 9 was treated with 1% aqueous solution (w/v) of respective acids (as given in Table 9) for 1 day and mounted in a plate and frame (PF) module. On the feed side, an aqueous solution containing 1% acid (w/v) (as given in Table 9) and 1% glucose (w/v) was circulated. Water was circulated on the permeate side of the membrane as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 11 below.

TABLE 11

| Acid in feed | Flux of acid $(g \cdot m^{-2} \cdot h^{-1})$ | Flux of glucose $(g \cdot m^{-2} \cdot h^{-1})$ | Permeability of acid $(m \cdot sec^{-1})$ |
|---|---|---|---|
| Acetic acid | 17.27 (±0.2) | 0 | $9.12 \times 10^{-12}$ |
| Maleic acid | 4.88 (±0.1) | 0 | $2.01 \times 10^{-12}$ |
| Fumaric acid | 5.75 (±0.5) | 0 | $0.88 \times 10^{-12}$ |
| Succinic acid | 3.15 (±0.5) | 0 | $0.86 \times 10^{-12}$ |
| Malic acid | 4.03 (±0.02) | 0 | $1.24 \times 10^{-12}$ |

Example 15

The membrane (i) prepared as given in Example 9 with active area of 330 cm² and 54 μm thick was mounted in a plate and frame (PF) module. On the feed side, 300 ml lactic acid fermentation broth containing 10% glucose initially and inoculated with *Lactobacillus* sp was circulated. Water (200 ml) was circulated on the permeate side of the membrane as a stripping agent. The fermentor was maintained at 40° C. The stripping side solution was replaced after each 2 h. The samples from both the sides were analyzed by HPLC. The analysis showed that the lactic acid transport rate was 0.07 $g.m^{-2}.h^{-1}$. Glucose was not detected on the permeate side.

Example 16

The membranes (i) prepared as given in Example 9, was mounted in a plate and frame (PF) module. On the feed side, an aqueous solution containing 4% NaOH was circulated. Water was circulated on the permeate side of the membrane as a stripping agent. The experiment was carried out at 40° C. The samples at various time intervals were analyzed by titration to determine the rate of base transport. The built up in base concentration in the stripping side of the membrane is given in FIG. 1. The average flux and permeability of NaOH were 34.34 $g.m^{-2}.h^{-1}$ and $8.23 \times 10^{-12}$ $m.sec^{-1}$, respectively.

Example 17

The membrane (ii) prepared as given in Example 9, was mounted in a plate and frame (PF) module. On the feed side, an aqueous solution containing 0.1% aqueous NaCl was circulated. Water was circulated on the permeate side of the membrane as a stripping agent. The experiment was carried out at 40° C. The transport was analyzed by continuous conductivity analysis of the stripping side. Conductivity showed that there was no transport of NaCl on permeate side (conductivity remained same as that of initial). The membrane (v) also did not show any transport of NaCl.

Example 18

The membrane (i) prepared as given in Example 9 was mounted in a plate and frame (PF) module. On the feed side, an aqueous solution containing 1 N inorganic acid (as given in Table 7) and 4% glucose (w/v) was circulated. Water was circulated on the permeate side of the membrane as a stripping agent. The transport of acid through the membrane was studied at 40° C. The samples at various time intervals were analyzed by titration to determine the acid transport. At the end of the experiment, stripping solution was analyzed by DNSA for occurrence of glucose. The results are summarized in Table 12 below.

TABLE 12

| Acid in feed | Flux of acid $(g \cdot m^{-2} \cdot h^{-1})$ | Flux of glucose $(g \cdot m^{-2} \cdot h^{-1})$ | Permeability of acid $(m \cdot sec^{-1})$ |
|---|---|---|---|
| Sulfuric acid | 302.2 (±10) | 0 | $5.34 \times 10^{-11}$ |
| Hydrochloric acid | 240.4 (±20) | 0 | $5.46 \times 10^{-11}$ |
| Nitric acid | 333.9 (±15) | 0 | $4.22 \times 10^{-11}$ |

We claim:

1. A membrane comprising polybenzimidazole and aromatic polyester, wherein
   said polybenzimidazole comprises recurring units of the formula II

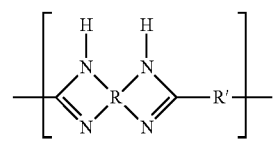

Formula II (i) wherein, R belongs to the tetraamine monomer having structure III(a)-III(f) and R' is from dicarboxylic acid as shown in structure IV:

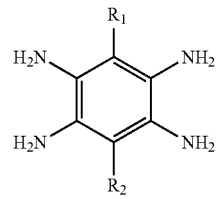

III (a)

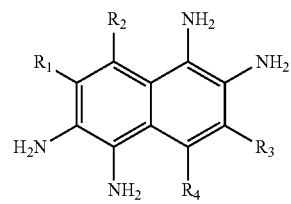

III (b)

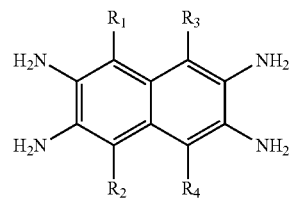

III (c)

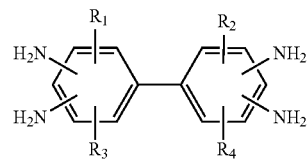

III (d)

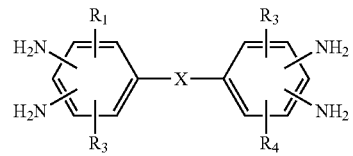

III (e)

wherein, each of $R_1$, $R_2$, $R_3$, $R_4$ is independently selected form a group consisting of H, $CH_3$, $CF_3$, F, Cl, Br, I, $NO_2$ or $C_{1-24}$ alkyl or aryl groups and X can be any of the following: $—CH_2—$, $—O—$, $—SO_2—$, $—C(CH_3)_2—$, $—C(CF_3)_2—$, $—C(Ph)_2-$, $—CH_3C(Ph)-$, $—CH_3C(isopropyl)-$, $—CH_3C(t-butyl)-$, $—CH_3C(n-propyl)-$, $—CH_3C(ethyl)-$ or any other $C_{1-24}$ containing alkyl or aryl groups,

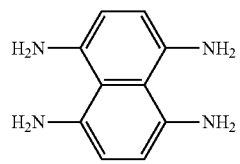

III (f)

IV where, k=1-30 containing alkyl, aryl, aromatic ring, arylene, alkylene, arylene-ether or heterocyclic ring such as pyridine, pyrazine, furan, quinoline or thiophene groups as straight chain, branched, cyclic, aromatic or combination of these; Y=O, N, S, halogen or combination thereof, n=0-10 and m=appropriate numbers of hydrogen (ii) the aromatic polyester has recurring units of structural formula V

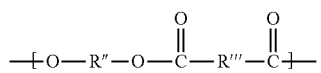

V wherein, R" is derived from phenolphthalein or its derivatives as shown in formula VI, and R''' is from dicarboxylic acid as shown in IV:

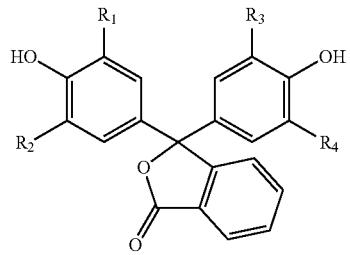

VI wherein $R_1$-$R_4$ are as defined above.

2. A membrane for deacidification, wherein said membrane is prepared by a process comprising:

a) preparing a blend pre-membrane by dissolving a polybenzimidazole (PBI) and a aromatic polyester (PAr) in appropriate proportion in a first solvent and subsequently evaporating the first solvent; wherein said polybenzimidazole comprises recurring units of the formula II

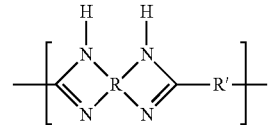

Formula II (i) wherein, R belongs to the tetraamine monomer having structure III(a)-III(f) and R' is from dicarboxylic acid as shown in structure IV:

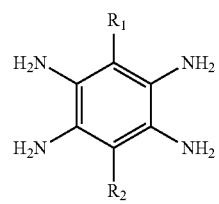

III(a)

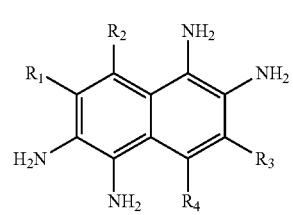

III(b)

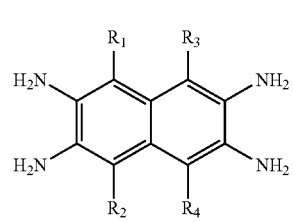

III(c)

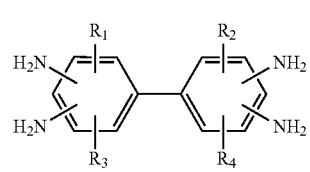

III(d)

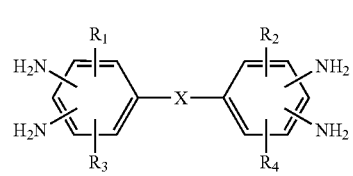

III(e)

wherein, each of $R_1$, $R_2$, $R_3$, $R_4$ is independently selected form a group consisting of H, $CH_3$, $CF_3$, F, Cl, Br, I, $NO_2$ or $C_{1-24}$ alkyl or aryl groups and X can be any of the following: $—CH_2—$, $—O—$, $—SO_2—$, $—C(CH_3)_2—$, $—C(CF_3)_2—$, $—C(Ph)_2-$, $—CH_3C(Ph)-$, $—CH_3C(isopropyl)-$, $—CH_3C(t-butyl)-$, $—CH_3C(n-propyl)-$, $—CH_3C(ethyl)-$ or any other $C_{1-24}$ alkyl or aryl groups,

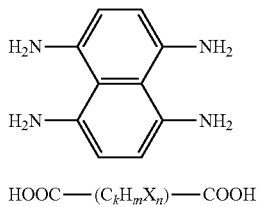

III (f)

HOOC—$(C_kH_mX_n)$—COOH    IV where, k=1-30 containing alkyl, aryl, aromatic ring, arylene, alkylene, arylene-ether or heterocyclic ring such as pyridine, pyrazine, furan, quinoline or thiophene groups as straight chain, branched, cyclic, aromatic or combination of these; Y=O, N, S, halogen or combination thereof, n=0-10 and m=appropriate numbers of hydrogen (ii) the aromatic polyester has recurring units of structural formula V

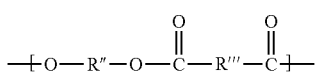

V wherein, R″ is derived from phenolphthalein or its derivatives as shown in formula VI and R‴ is from dicarboxylic acid as shown in IV:

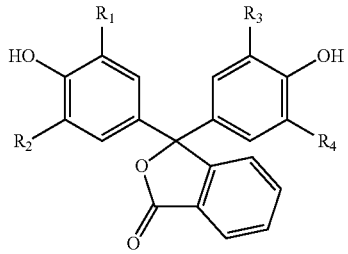

VI wherein $R_1$-$R_4$ are as defined above,
b) leaching out the polyester from the pre-membrane by treating the pre-membrane with a base solution at a temperature ranging between 20 to 80° C. for a period ranging between 1 to 15 days, and
c) washing the membrane with a second solvent,
wherein the membrane has molecular size porosity.

3. The membrane as claimed in claim 1 wherein said membrane is in the form of flat sheet, hollow fiber, tubular form, thin film composite, asymmetric membrane or any adaptable form.

4. A process of deacidification using the membrane of claim 2 wherein: R is derived from tetramine as shown in Figure VII (a)- VII (e) and R' is from dicarboxylic acid as shown in Figure VIII (a)- VIII (k),

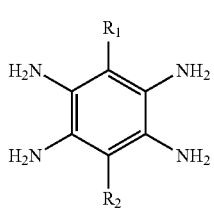

Figure VII (a)

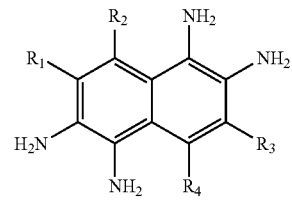

Figure VII (b)

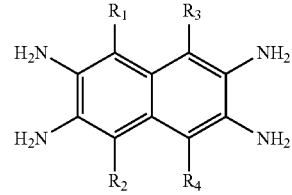

Figure VII (c)

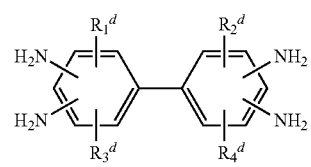

Figure VII (d)

where; $R^d_1$, $R^d_2$, $R^d_3$, $R^d_4$=H, $CH_3$, $CF_3$, F, Cl, Br, I, $NO_2$ or $C_{1-18}$ alkyl or aryl groups,

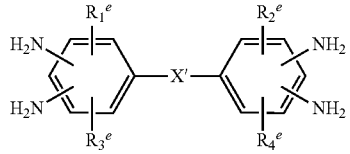

Figure VII (e)

where; $R^e_1$, $R^e_2$, $R^e_3$, $R^e_4$=H, $CH_3$, $CF_3$, F, Cl, Br, I, $NO_2$ or $C_{1-15}$ containing alkyl or aryl groups and X' can be any of the following: —$CH_2$—, —O—, —$SO_2$—, —$C(CH_3)_2$—, —$C(CF_3)_2$—, —$C(Ph)_2$-, —$CH_3C(Ph)$-, —$CH_3C$(isopropyl)-, —$CH_3C$(t-butyl)-, —$CH_3C$(n-propyl)-, —$CH_3C$(ethyl)- or any other $C_{1-15}$ containing alkyl or aryl groups,

Figure VIII (a)

HOOC—$(C_kH_mY_n)$—COOH

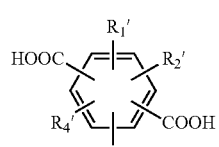

Figure VIII (b)

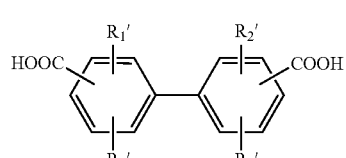

Figure VIII (c)

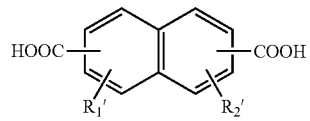

Figure VIII (d)

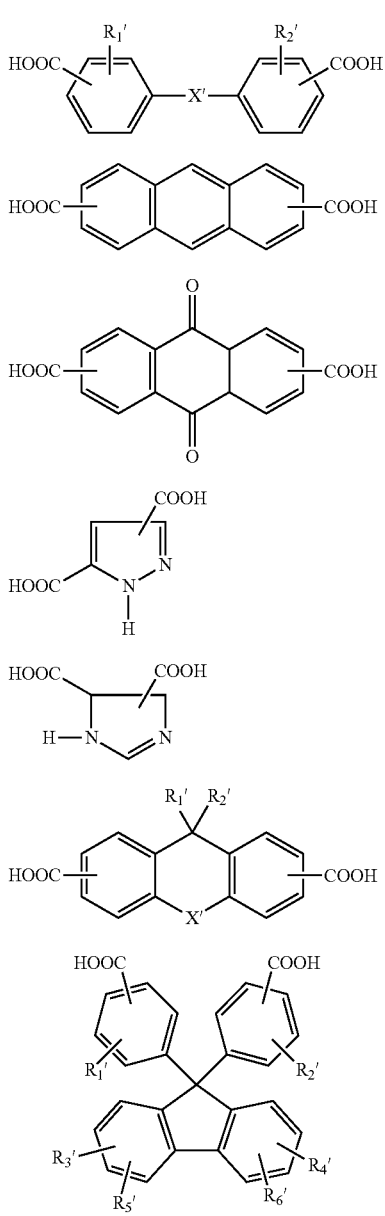

Figure VIII (e)

Figure VIII (f)

Figure VIII (g)

Figure VIII (h)

Figure VIII (i)

Figure VIII (j)

Figure VIII (k)

where; $R'_1, R'_2, R'_3, R'_4, R'_5, R'_6$=H, $CH_3$, $CF_3$, F, Cl, Br, I, $NO_2$ or $C_{1-15}$ containing alkyl, aryl, aromatic ring, arylene, alkylene, arylene-ether or heterocyclic ring such as pyridine, pyrazine, furan, quinoline, thiopene groups.

5. A process for deacidification as claimed in claim 4, wherein said process of deacidification comprises the steps of:
  a) optional pre-treatment of the membrane with the solution of acid intended to be separated;
  b) circulating the feed solution containing the acid that is intended to be separated on the feed side of the membrane and
  c) circulating the stripping agent on the permeate side of the membrane.

6. The process as claimed in claim 4, wherein the feed solution comprises at least one acid in concentration greater than 0.001%.

7. The process as claimed in claim 6, wherein said feed solution comprises organic acid, inorganic acid, organic salt, inorganic salt, sugar, polymer, oligomer, protein, living or dead cell and pigment, alone or in combinations thereof.

8. The process according to claim 4, wherein said process is operated in the temperature range from −70° C. to 200° C.

9. The process as claimed in claim 4, wherein said stripping agent comprises of water, organic solvents, organic bases, inorganic bases, ionic liquid and supercritical carbon dioxide.

10. The process as claimed in claim 8, wherein said organic solvents is selected a group consisting of from acetone, alcohols, ethyl acetate, diethyl ether, hexane, toluene, methyl ethyl ketone, tetrahydrofuran, dioxane, dimethyl formamide and dimethyl acetamide, alone or in combinations thereof.

11. The process as claimed in claim 8, wherein said inorganic bases are selected from a group consisting of NaOH, KOH, ammonia, Na2CO3 and NaHCO3, alone or in combinations thereof.

12. The process as claimed in claim 8, wherein said organic bases is selected from a group consisting of triethyl amine, trimethyl amine, trioctyl amine, ethyl amine, diethyl amine, ethanolamine, diethanolamine, butyl amine, tributyl amine, aniline and derivatives of aniline, alone or in combinations thereof.

13. The process as claimed in claim 4 wherein the polybenzimidazole membrane is optionally treated before use with organic solvents selected from acetone, water, methanol, ethanol, isopropanol, hexane, petroleum ether, propanol, butanol, hexanol, cyclohexanol, octanol, pentanol, isobutanol, dimethyl formamide, dimethyl acetamide, N-methyl 2-pyrrolidone, chloroform, toluene, cyclohexane, tetrachloroethane, tetrachloromethane, dichloromethane, aniline, derivatives of aniline, ionic liquids, supercritical carbon dioxide, feed solution, alone or in combinations thereof.

14. The membrane as claimed in claim 2, wherein said base is an aqueous or alcoholic solution of organic or inorganic base selected from a group consisting of KOH, NaOH, triethyl amine, trimethyl amine, dimethyl formamide, dimethyl acetamide, aniline, alone or in combinations thereof, solvents selected from dioxane, tetrahydrofuran, acetone and methyl ethyl ketone, alone or in combinations thereof.

15. The membrane as claimed in claim 2, wherein the first solvent is N,N-dimethylacetamide and said second solvent for washing the membrane is selected from a group consisting of acetone, water, methanol, ethanol, isopropanol, hexane, petroleum ether, propanol, butanol, hexanol, cyclohexanol, octanol, pentanol, isobutanol, chloroform, toluene, cyclohexane, tetrachloroethane, tetrachloromethane, dichloromethane, aniline, derivatives of aniline, ionic liquids and supercritical carbon dioxide, alone or in combinations thereof.

16. A process for preparing the membrane as claimed in claim 2, said process comprising:
  a) preparing a blend membrane, which comprises polybenzimidazoles (PBI) and aromatic polyester (PAr) in appropriate proportion;
  b) leaching out the polyester from the membrane by treating the membrane with a base solution at a temperature ranging between 20 to 80° C. for a period ranging between 1 to 15 days,
  c) washing the membrane with a solvent.

* * * * *